United States Patent [19]
Heinemann et al.

[11] Patent Number: 5,272,935
[45] Date of Patent: Dec. 28, 1993

[54] HAND BRAKE WITH AN ADJUSTING DEVICE FOR A MOTOR VEHICLE

[75] Inventors: Heinz W. Heinemann, Wuppertal; Sven Bode, Remscheid, both of Fed. Rep. of Germany

[73] Assignee: Ed. Scharwächter GmbH & Co. KG, Remscheid, Fed. Rep. of Germany

[21] Appl. No.: 960,661

[22] Filed: Oct. 14, 1992

[30] Foreign Application Priority Data

Apr. 7, 1992 [DE] Fed. Rep. of Germany ....... 4211566

[51] Int. Cl.⁵ .............................................. G05G 1/04
[52] U.S. Cl. ...................................... 74/523; 74/575; 74/577 M; 74/535; 74/537
[58] Field of Search ........................... 74/535–538, 74/575–578, 523–526, 557, 501.5 R, 502

[56] References Cited

U.S. PATENT DOCUMENTS

| | | | |
|---|---|---|---|
| 4,138,905 | 2/1979 | Konishi | 74/535 |
| 4,512,210 | 4/1985 | Gurney | 74/535 |
| 4,515,036 | 5/1985 | Dotson | 74/535 |
| 4,819,501 | 4/1989 | Kraus et al. | 74/535 X |
| 4,854,187 | 8/1989 | Walters | 74/535 |
| 5,001,942 | 3/1991 | Boyer | 74/501.5 R X |
| 5,067,366 | 11/1991 | Gandiglio | 74/538 X |

FOREIGN PATENT DOCUMENTS

0456097  11/1991  European Pat. Off. ............. 74/535

*Primary Examiner*—Vinh T. Luong
*Attorney, Agent, or Firm*—Anderson Kill Olick & Oshinsky

[57] ABSTRACT

A hand brake for a motor vehicle includes a hand lever pivotably supported on a support bracket fixed to the vehicle body, and an adjusting disc likewise supported on the support bracket and connecting the hand lever with a pull member leading to a wheel brake shoe. A detent pawl supported on the hand lever cooperates with a toothed segment formed integrally with the support bracket and is released with an actuation rod longitudinally displaceable in the hand lever. The hand lever is connectable with the adjusting disc by a coupling pawl supported on the hand lever and slidably engaging a guide pin secured to a side surface of the support bracket. The adjusting disc is springbiased in the rotational direction so that it provides for progressive pull member displacement/force ratio.

8 Claims, 2 Drawing Sheets

HAND BRAKE WITH AN ADJUSTING DEVICE FOR A MOTOR VEHICLE

BACKGROUND OF THE INVENTION

The present invention relates to a hand brake with an adjusting device for a motor vehicle including a two-part hand lever pivotably mounted on a support bracket fixedly secured to the vehicle body, and connected, by a pull member, to a wheel brake shoe, and a detent pawl supported on the hand lever and releasable with an actuation rod longitudinally displaceable in the hand lever shaft. The detent pawl cooperates with a toothed segment secured to the support bracket. The pull member is coupled to the hand lever by a spring-biased adjusting disc which is arranged concentrically with the hand lever and is movable relative to the hand lever upon release of the hand brake.

A hand brake with an adjusting device for a motor vehicle of the type described above is disclosed in European patent 162,749. In this hand brake, the pull member is connected to an adjusting member having a form of a disc segment supported on the support bracket for axial displacement and rotation about an axis which is concentric with the axis of rotation of the hand lever. The disc segment is biased in the circumferential direction with a torsion spring in such a manner that the pull member is held, under a certain spring load, free of backlash when the adjusting member is disconnected from the hand lever. In this hand brake, the hand lever is formlockingly connected with the adjusting member by an axially spring-biased coupling. The hand brake of EP-PS 162,749 is characterized by high costs of manufacturing and assembly. In addition, the functional reliability of the hand brake with such adjusting device strongly depends on the reliability of the coupling that connects the adjusting member and, thus, the pull member with the hand lever. An evident drawback of this known adjusting device is its requirement for a large mounting space in the vehicle because of axial displacement of the adjusting member.

EP-0 351 131 discloses an adjusting device that includes an adjusting disc which is supported concentrically with the hand lever but independently therefrom, is biased in the rotational direction by a helical spring, and is formed as a circumferentially toothed disc segment. This disc segment, upon brake application, is automatically coupled to the hand lever by an engaging dog supported on the disc segment and biased in a return direction with a return spring. The engaging dog is formed as a rocker one arm of which cooperates with the circumferential toothing of the disc segment and the other arm cooperates with a restoring stop element fixed on the support bracket in such a manner that, upon complete return of the hand lever to its release position, the hand lever is decoupled from the segment disc, and the disc segment is held in its position exclusively under the action of the segment disc-biasing spring.

A hand brake with an automatic adjusting device of the type described above places stringent requirements to the absence of backlash of the restoring stop associated with the engaging dog. This is because even relatively insignificant deflection of the engaging dog from a predetermined displacement can affect its cooperation with the restoring stop with the latter being positioned within acceptable tolerances, and, thus, the functional reliability of the adjusting device. Moreover, in the known construction of the adjusting device, for fixing the hand lever in its position corresponding to application of the brake, the arbitrary actuated detent pawl and the engaging dog of the adjusting member are mounted on the same bearing pin directly opposite each other, and, therefore, in particularly with an increased corrosion or clogging of the bearing elements, there is a danger of improper engagement of the detent pawl and the engaging dog, which further results in impairment of the functional reliability of the hand brake.

Accordingly, an object of the invention is an improved hand brake with an automatic adjusting device for a motor vehicle, which is characterized by reduced manufacturing costs and reduced requirement for a mounting space in the vehicle and which insures an optimal functional reliability of the adjusting device and, thus, the brake.

SUMMARY OF THE INVENTION

According to the invention, there is provided a hand brake with an adjusting device for a motor vehicle, in which the adjusting device comprises a partially cut-off circular disc having toothing at least on a part of its circumference, which is spring-biased in the circumferential direction by a tangentially applied spring force, and which has a progressive cable displacement/force ratio so that, upon angular displacement of the hand lever at the beginning of an actuation stroke, there is a large cable displacement with a large force applied to the hand lever and, at the end of the actuation stroke, a small cable displacement takes place with a small hand lever moment. The adjusting device further comprises a coupling pawl associated with the cut-off circular disc and pivotably supported on the hand lever on a beaded pin. The coupling pawl is adapted to slide along a guide member mounted on the support bracket and supporting the coupling pawl.

The construction of the hand brake according to the invention and, in particular, providing an adjusting disc biasing spring which extends substantially parallel to the pull member and, thereby, insures symmetrical distribution of the load, has an advantage that a possibility of deflection of the adjusting disc under an action of an asymmetrical load is eliminated, and this increases the reliability of engagement of the adjusting disc with the associated therewith coupling pawl that lies in the same plane as the adjusting disc. Arrangement of the adjusting disc and the coupling pawl in the same plane makes possible making of the coupling pawl and the adjusting disc from thin sheet metal. Such construction of the adjusting device with the coupling pawl slidably supported on a guide secured to the support bracket, insures a very reliable engagement and disengagement of the coupling pawl upon application of the brake and movement of the hand lever in its release position, respectively.

BRIEF DESCRIPTION OF THE DRAWINGS

The present invention both as to its construction so to its mode of operation will be best understood from the following detailed description of the preferred embodiment when read with reference to the accompanying drawings, wherein.

DETAILED DESCRIPTION OF THE PREFERRED EMBODIMENT

Figure 1:
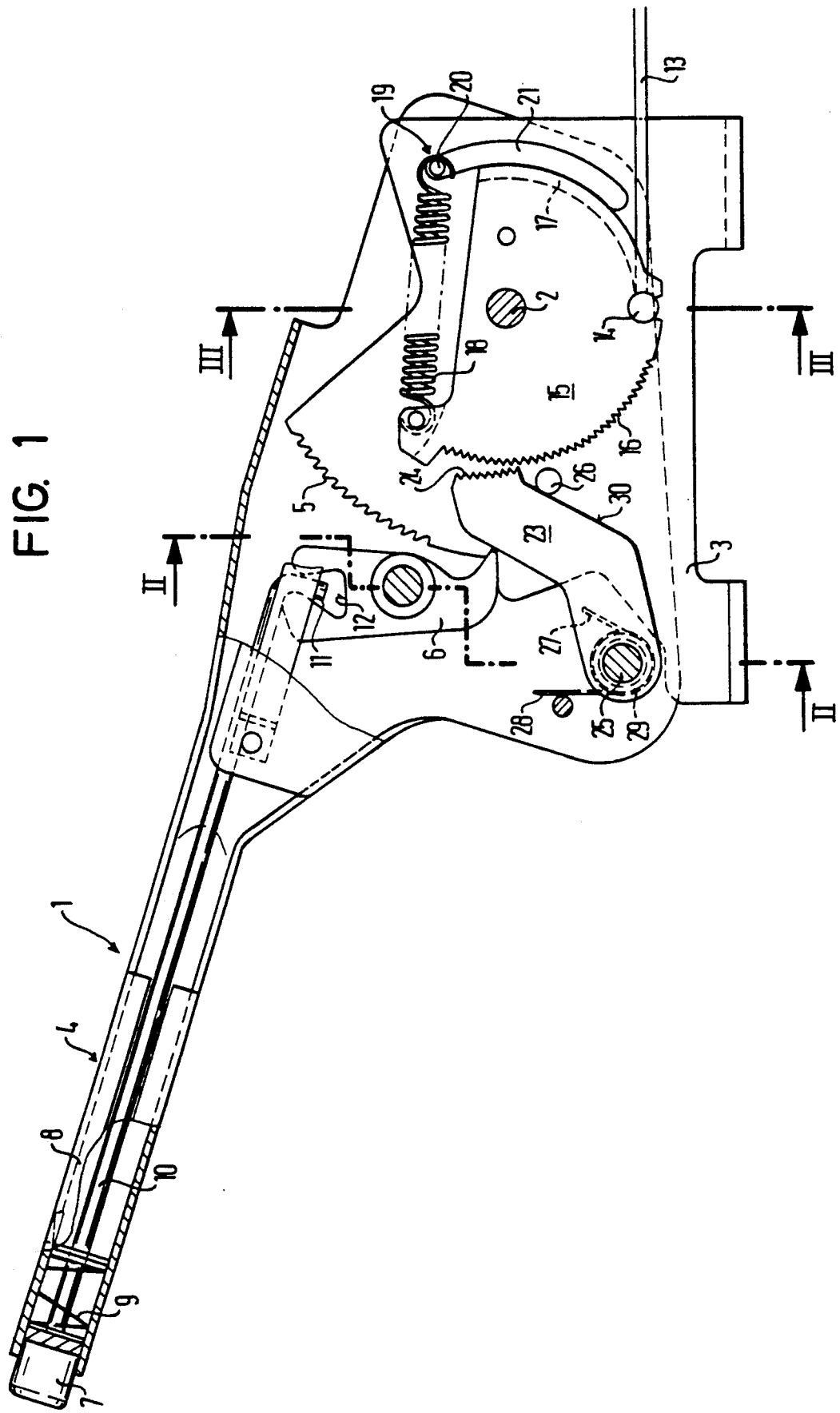
FIG. 1 shows a partially cross-sectional side view of a hand brake with an adjusting device according to the present invention.
Figure 2:
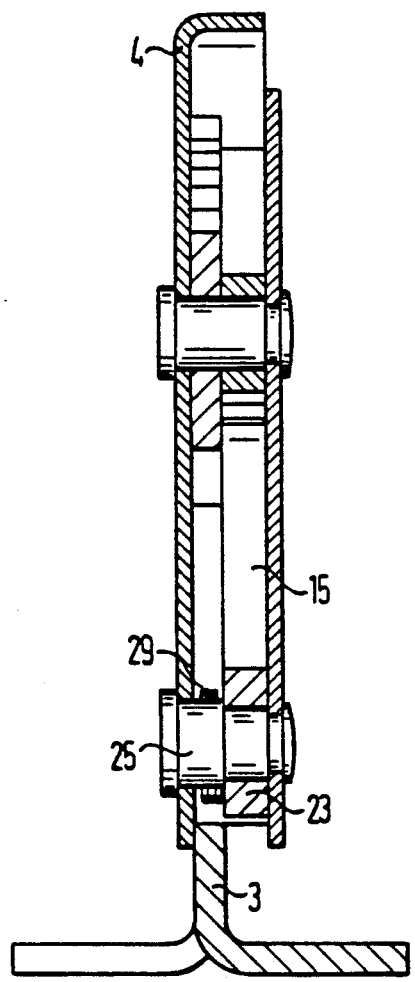
FIG. 2 shows a cross-sectional view along line II—II in FIG. 1.
Figure 3:
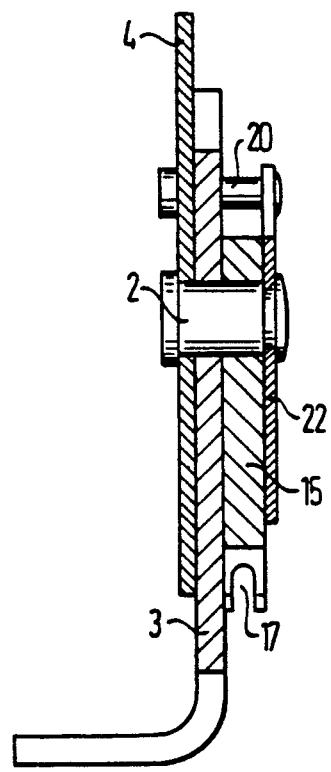
FIG. 3 shows a cross-sectional view along line III—III in FIG. 1.

A hand brake shown in the drawings and designated with a reference numeral 1 comprises a hand lever 4 pivotably mounted on a support bracket 3 fixedly secured to a vehicle body. The hand lever 4 is formed as a shell-like profiled sheet material workpiece that is supported on the support bracket with a bearing bolt 2. For fixing the hand lever in a position corresponding to application of the hand brake, a detent pawl 6, which cooperates with a toothed segment 5 formed integrally with the support bracket 3, is pivotably supported on the hand lever 4. For releasing the detent pawl 6, there is provided an actuation rod 10 axially displaceable in a shaft portion 8 of the hand lever 4 against bias of a pressure spring 9. The actuation rod 10 is actuated with a pressure knob 7 and has an end bend portion 11 that formlockingly engages a cavity 12 in the rocker that forms the detent pawl 6. A pull memner, such as a pull cable 13, which connects the hand lever 4 with a wheel brake shoe (not shown in the drawings) is secured with a coupling member 14 to an adjusting disc 15 mounted on the bearing bolt 2 parallel to the hand lever 4 for free rotation about the bearing bolt 2. The adjusting disc 15 is formed as an indexing disc and has, on one half of its circumference, toothing 16 and, on the other half of its circumference, a support band 17 to which the pull cable 13 is connected. A tension helical spring 18 extending substantially parallel to the pull cable 13 is supported on the adjusting disc 15. The spring 18 is supported relative to the hand lever 4 at abutment 19 and tends to rotate the adjusting disc 15 in a direction of tensioning the pull cable 13. The abutment 19 is formed, as shown in FIG. 3, by a pin 20 that extends in a curved groove 20, formed in the support bracket 3 concentric with the adjusting disc 15, from the hand lever 4 to a cover plate 22 to which it is secured by riveting. The hand lever 4 may be provided with a recess in the side surface thereof for receiving the head of the pin 20. To insure a reliable coupling of the hand lever 4 with the adjusting disc 15 upon application of the hand brake, the hand lever 4 is provided with a coupling pawl 23 having at its free end a toothed segment 24 complementary to the circumferential toothing 16 of the adjusting disc 15. The coupling pawl 23 is located in a common plane with the adjusting disc 15 and is substantially S-shaped. The coupling pawl 23 is supported on the hand lever 4 on axle in a form of a beaded pin which is secured to the cover plate 22 by riveting. The coupling pawl 23 is adapted to slide, during the return movement, on a guide pin 26 secured to the support bracket 3 and projecting sidewise therefrom. To insure that a guide edge 30 of the coupling pawl 23 constantly engages the guide pin 26, there is provided a leg spring 29 concentrically supported on the beaded pin 25 and having its one leg 27 abutting the coupling pawl and the other leg 28 abutting the hand lever 4.

While a particular embodiment of the invention has been shown and described, various modifications thereof will be apparent to those skilled in the art and, therefore, it is not intended that the invention be limited to the disclosed embodiment or to the details thereof, and departures may be made therefrom within the spirit and scope of the invention as defined in the appended claims.

What is claimed is:

1. A hand brake for use in a motor vehicle having a body and a wheel brake shoe, said hand brake comprising a pull member acting on the wheel brake shoe; a support bracket fixedly secured to the vehicle body; a hand lever pivotally mounted on said support bracket and connected with said pull member; a detent pawl associated with said hand lever and pivotally mounted therein; latching means cooperating with said detent pawl and comprising a toothed segment fixedly mounted on said support bracket; an actuation rod displaceably mounted within said hand lever for releasing said detent pawl; and adjusting means for connecting said hand lever with said pull member, said adjusting means including an adjusting disc having toothing on a least a portion of a circumference of said adjusting disc, a spring for biasing said adjusting disc in a rotational direction thereof and providing for progressive pull member displacement/force ratio, a coupling pawl associated with said adjusting disc and tiltably supported on said hand lever for connecting said hand lever with said adjusting disc upon application of the hand brake, and a guide secured said supported bracket for slidably supporting said coupling pawl; said coupling pawl having a guide edge extending tangentially to the circumference of said adjusting disc and engaging said guide, said adjusting means further comprising an axle for supporting said coupling pawl on said hand lever and a leg spring arranged concentrically with said axle and abutting said hand lever for biasing said guide edge into engagement with said guide.

2. A hand brake as set forth in claim 1, wherein said adjusting disc and said coupling pawl are made of a sheet material and lie in a common plane.

3. A hand brake as set forth in claim 1, wherein said coupling pawl is formed as a one-arm lever having at its free end a toothed segment complementary to the toothing of said adjusting disc.

4. A hand brake as set forth in claim 1, wherein said adjusting disc, on a portion of its circumference which is opposite to the portion provided with the toothing, has a support band for connection with said pull member.

5. A hand brake for use in a motor vehicle having a body and a wheel brake shoe, said hand brake comprising a pull member acting on the wheel brake shoe; and a support bracket fixedly secured to the vehicle body; a hand lever pivotally mounted on said support bracket and connected with said pull member; a detent pawl associated with said hand lever and pivotally mounted thereon; latching means cooperating with said detent pawl and comprising a toothed segment fixedly mounted on said support bracket; an actuation rod displaceably mounted within said hand lever for releasing said detent pawl; and adjusting means for connecting said hand lever with said pull member, said adjusting means including an adjusting disc having toothing on at least a portion of a circumference of said adjusting disc, a spring for biasing said adjusting disc in a rotational direction thereof and providing for progressive pull member displacement/force ratio, a coupling pawl associated with said adjusting disc and tiltably supported on said hand lever for connecting said hand lever with said adjusting disc upon application of the hand brake, and a guide secured to said support bracket for slidably supporting said coupling pawl, said guide being a circular pin projecting sidewise of said support bracket.

6. A hand brake for use in a motor vehicle having a body and a wheel brake shoe, said hand brake comprising a pull member acting on the wheel brake shoe; a support bracket fixedly secured to the vehicle body; a hand lever pivotally mounted on said support bracket and connected with said pull member; a detent pawl associated with said hand lever and pivotally mounted thereon; latching means cooperating with said detent pawl and comprising a toothed segment fixedly mounted on said support bracket and actuation rod displaceably mounted within said hand lever for releasing said detent pawl; adjusting means for connecting said hand lever with said pull member, said adjusting means including an adjusting disc having toothing on at least a portion of a circumference of said adjusting disc, a spring for biasing said adjusting disc in a rotational direction thereof and providing for progressive pull member displacement/force ratio, a coupling pawl associated with said adjusting disc and tiltably supported on said hand lever for connecting said hand lever with said adjusting disc upon application of the hand brake, and a guide secured to said support bracket for slidably supporting said coupling pawl, said biasing spring comprising a linear helical spring secured to said adjusting disc and supported on said hand lever; and means for supporting said linear helical spring on said hand lever and including a curved groove formed in said support bracket and arranged concentrically to said adjusting disc.

7. A hand disc as set forth in claim 6, wherein said hand lever is formed as a shell-like profiled sheet material workpiece, said hand brake further comprising a cover plate, at least said coupling pawl and said adjusting disc being held substantially without backlash between said support bracket and said cover plate.

8. A hand brake as set forth in claim 7, wherein said hand brake comprises a bearing bolt for supporting said hand lever and said adjusting disc on said support bracket, said adjusting means comprises an axle for supporting said coupling pawl on said hand lever, and said supporting means comprising a pin extending in said groove, said bearing bolt, said axle and said pin having each a head received in a recess provided in a surface of said hand lever and being secured to said cover plate by riveting.

* * * * *